United States Patent Office 3,061,400
Patented Oct. 30, 1962

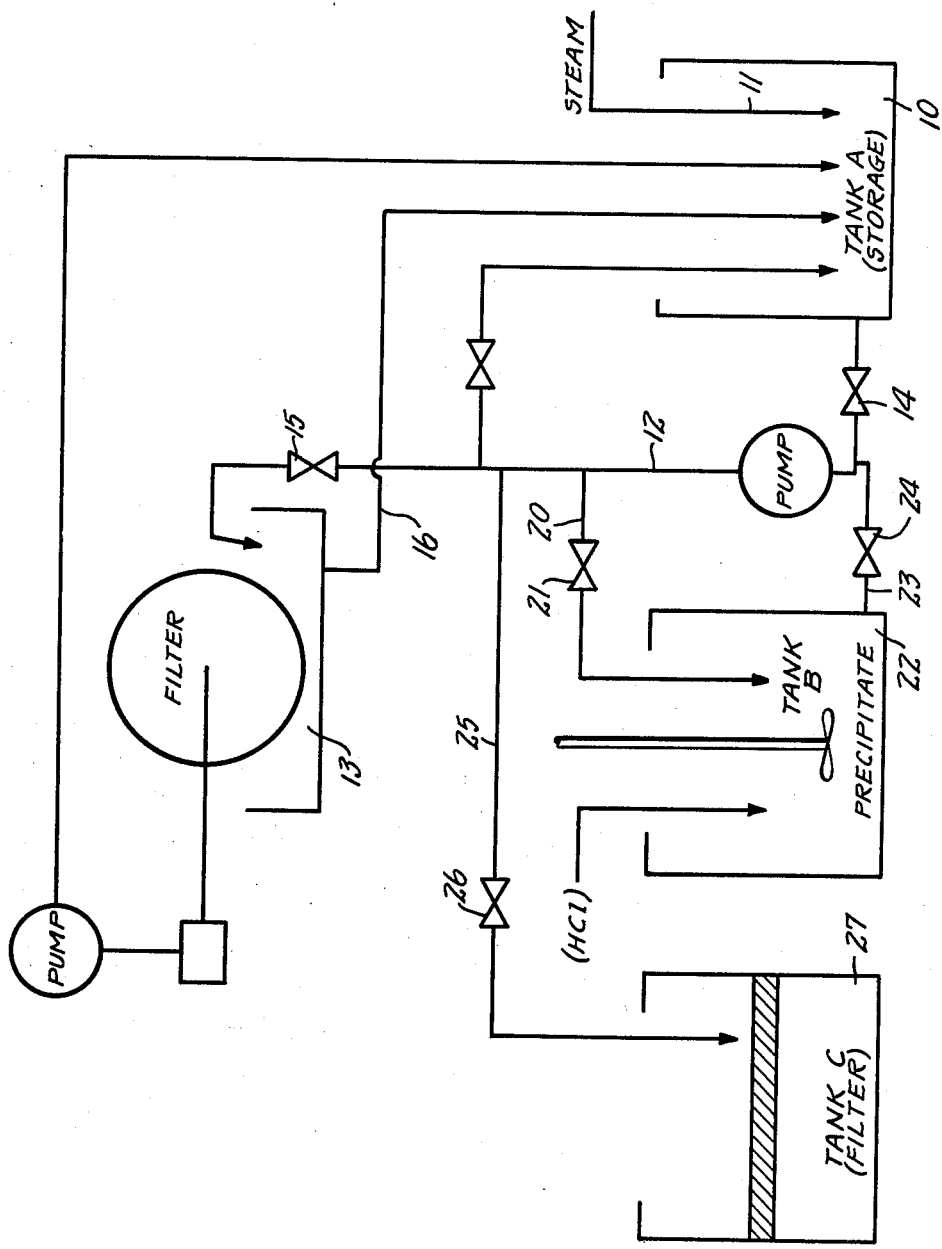

3,061,400
METHOD OF CLEANING FILTER SURFACES
Robert E. Naegele, Denver, Colo., assignor to The Dow Chemical Company, Midland, Mich., a corporation of Delaware
Filed Dec. 20, 1956, Ser. No. 629,656
6 Claims. (Cl. 8—137)

This invention relates to a method of cleaning woven or fabric filter media which have become blinded by deposition within the pores or the formation on the surfaces thereof of insoluble metal salts.

In the wet extraction of certain metals from ores the processes call for the filtration of large volumes of solution. It is in these situations, therefore, extremely important to keep the filter cloths as free and clear as possible from deposits which will clog the pores. Accordingly, it becomes important to clean filter cloths as soon as filtration rates drop off to any great extent. Finely divided materials approaching colloidal size may cause difficulties other than reduction of filter rate caused by the accumulation of large particles in the interstices of the cloth. A real part of the difficulty arises from the formation and actual growth in the fibres of deposits of insoluble metal salts.

The economics of ore processing dictates the need for effective rapid filtration and demands the utilization of processes of minimum cost and maximum efficiency for cleaning filter cloths.

It is, accordingly, a fundamental object of this invention to provide a simple and rapid method of cleaning filter media used in the extraction of metal values from ores.

It is another object of the invention to provide a method of cleaning filter media and regenerating the cleaning solution utilized in the operation, which may be carried out as a batch operation or a cyclical one.

Other objects and advantages of the invention will in part be obvious and in part appear hereinafter.

The invention is embodied in a process for the cleaning and reopening of fabric filter media which have become clogged through any of a variety of mechanisms which result in the deposition or production of finely divided materials in the interstices among the fibers thereof, which method is characterized by providing an aqueous solution of a polyamino polycarboxylic acid chelating agent, or such chelating agent in admixture wtih an alkanol amine, at a high alkaline pH of about 9 to 10 or higher and at a concentration of about 2–20 percent by weight, heating the said solution to a temperature in the range from 35–100° C., saturating the filter surfaces by vacuum soak or by agitation, blowing said filtered surfaces, and continuing the said operation until the filter surfaces are clean and reopened. Thereafter the solution of the chelating agent is passed to a regeneration cycle where it is strongly acidified to a low pH of about 2–1.5 to cause precipitation of the acid form of the chelating agent, which is thereafter rapidly separated from the aqueous acidified solution to prevent redissolution of chelating agent. The solid precipitated amino acid is redissolved in alkaline solution in preparation for another cleaning cycle.

Suitable chelating agents useful in this method of operation are those which correspond to the following general formula:

wherein X is selected from the group consisting of H, —CH$_2$COOM, —CH$_2$CH$_2$OH, —CH$_2$CH$_2$COOM M being an alkali metal, such as sodium, potassium, lithium, or ammonium base,

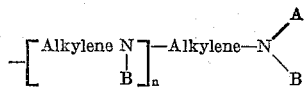

wherein Alkylene is a low molecular weight bivalent alkylene group which places 2–3 carbon atoms between the nitrogens, such as, ethylene, propylene, isopropylene, cyclohexylene; A and B are selected from the group consisting of H, —CH$_2$COOM, —CH$_2$CH$_2$OH but A and B need not be the same and not more than one of A, B or X is hydrogen; $n$ has a value of 0, 1, 2, 3, 4 or more.

Typical compounds coming within the scope of the formula and which are susceptible to this recovery process are glycine, iminodiacetic acid, nitrilotriacetic acid, triethanolamine, ethylenediaminetetraacetic acid, monoethanolethylenediaminetriacetic acid, diethanolethylenediaminediacetic acid and polymers of the ethylene diamine, containing hydroxy alkyl, and carboxymethyl groups on the amino hydrogen positions. Compounds of this latter type are those derived from diethylenetriamine, triethylene tetramine, tetraethylene pentamine.

In the drawing, the process has been illustrated by means of a flow diagram.

It has been found from experience, for example, in processes involving the aqueous extraction of uranium or beryllium from ores that at certain stages in the operation the life of the filter cloths used to separate solids from the uranium solution, or from tailings after U$_3$O$_8$ and U$_2$O$_5$ removal, is quite short, because quantities of finely divided materials, principally insoluble polyvalent metal salts, including CaSO$_4$, Fe$_2$(SO$_4$)$_3$, Fe$_3$(SO$_4$)$_2$, etc. or partially hydrated salts, become occluded in the interstices of the cloth. The filter surfaces thus become actually blinded by this precipitation and occlusion of polyvalent metal salts.

Experience in one large uranium extraction establishment indicated that it was necessary to change filter cloths every 10 to 15 days, at an overall cost at current existing rates of approximately $300 per filter bank of four 6-foot rotary disks per bank.

The following laboratory example will illustrate an experimented basis for the process:

Employing a leaf type filtration device with a filtering area of 1/10 square foot, filtering was carried out under a 5" mercury vacuum. With a filter surface made of blinded cloth, the flow rate of ordinary water through the filter at room temperature was approximately 15 milliliters of water per second per square foot of filter cloth. A solution of ethylenediaminetetraacetic acid, sodium salt of 4.5 percent concentration was prepared. A 500 milliliter quantity of this solution in being passed through the blinded filter quickly came up to a flow rate of 100 milliliters per second per square foot. Subsequent water runs through this cleaned filter gave the same rate of filtration, that is 100 milliliters per second, per square foot. This represented about a seven-fold increase in filtration rate. Further cleaning runs with less concentrated solutions of ethylenediaminetetraacetic acid sodium salt, i.e., down to 1 percent required, substantially larger volume of cleaning solution.

A blank test with a 1000 milliliter portion of 4.5 percent ethylenediaminetetraacetic acid solution through a sample of the filter cloth unused gave a subsequent water filtration rate of slightly over 100 milliliters per second. This was taken as an indication that the 500 milliliter portion of 4.5 percent ethylenediaminetetraacetic acid was about sufficient for cleaning a filter cloth of 1/10 square foot area and served as a factor for determining the volume for a full scale run.

A check of the ethylenediaminetetraacetic acid solution following the cleaning operation revealed that 10 percent of the chelating agent in the 500 milliliter run had been consumed in the process. By recirculation this partially spent cleaning solution is useful for several cleaning operations; that is, when about 75 percent of its chelating capacity has been spent, it is not much more effective in cleaning than water.

In actual plant operations I have found that a similar cleaning operation conducted on the full size commercial filters at 10 day to 15 day intervals has resulted in extending the life of the filter clots 5 to 8 or 10 fold and the cost of the chelating agent wash is about $60 per filter bank. In addition, the chelating agent wash is a very simple operation rapidly carried out and the cycle is such that the solution may be regenerated easily with recovery of more than two-thirds of the chelating agent value therein.

The following procedure referred to the flow diagram has been adopted as standard practice for carrying out the process on large scale commercial size filters:

Using ethylenediaminetetraacetic acid as a most common, generally useful, and easily available chelating agent a solution of the compound in water is prepared at a concentration of about 5 to 7 percent and the pH adjusted to a level between about 10 and 11 in storage tank 10. The volume of the solution is determined by the size and the capacity of the filters and generally it should be of an amount roughly equal to the volume of the solution which normally can be handled by the clean filter in 30 seconds. The solution thus prepared is heated with steam from line 11 to a temperature of about 150° F. (65° C.) to boiling and is pumped through line 12 into the filter tub 13. Valves 14 and 15 permit control of direction of flow. The filter is then rotated with vacuum and blown and this operation is continued until the cloth is clean; all of the solution in the filter tub is drained back to tank A through line 16 together with any solid matter which may have been dislodged from the filter surface.

The mechanism of the action of the chelating agent is that it either dissolves the insoluble salts which have been occluded on the fibres of the filter cloth or it damages their crystal structure sufficiently to loosen them and the blowing of the filter serves to dislodge this material from the cloth.

The regeneration cycle for the materials is fitted into the normal operations substantially as follows:

The spent solution is pumped from the storage tank 10 through the line 20 and valve 21 into tank 22 where concentrated hydrochloric acid is added to reduce the pH to a level of about 2.5 to 1. This is done with agitation. The suspension of precipitated chelating agent is then pumped through line 23, valve 24, lines 12, 25 and valve 26 to tank 27 for filtration, where the precipitated acid is separated and thereafter transferred to tank 22. Water and caustic soda are then added to dissolve the precipitated acid and bring it to the preferred useful concenration, following which it is pumped back to tank 10 where it is adjusted to useful strength by either addition of chelating agent or water to bring the concentration up to the desired level.

The cycle of operations thus described is basically the one used whichever chelating agent or combination of chelating agents is selected. Fundamentally, ethylenediaminetetraacetic acid is preferred because it is common and relatively inexpensive. However, where it has limitations, due to the fact that its chelating capacity is limited by the nature of the metal compounds to be dislodged from the filter cloth in the cleaning, modified compositions may be used. I have found monohydroxy-ethylenediaminetriacetic acid useful but it has the disadvantage that recovery by means of the acidification is not easy. For some purposes nitrilotriacetic acid is useful. Monoethanol glycine and diethanol glycine and mixtures thereof with ethylenediaminetetraacetic acid are quite useful wherever substantial quantities of iron must be controlled.

In an industrial installation the following procedure was used to clean blinded filter cloths:

Filter type—disk leaf filter
Type blinding—iron clay and vanadium

An aqueous solution containing 5 percent by weight of triethanolamine, 5 percent by weight of caustic soda, and 1 percent by weight of ethylenediaminetetraacetic acid was prepared and heated to 110° F. to 220° F. (43° C.–105° C.) and used to clean the cloths in place as described in connection with the flow diagram.

I have found it also possible to effect cleaning of the filter cloths by forcing the cleaning solution, with steam, in reverse through the filter surfaces, i.e., in the direction opposite to that in which filtrate flows. At the same time, I maintain cleaning solution in the filter trough, agitating it during the flow of solution to accelerate the cleaning.

In summary the procedure for cleaning filter surfaces, whatever the nature of the fabric used, is to prepare a solution of the polyaminopolycarboxylic acid of a concentration of approximately 5 percent by weight. Higher concentrations ranging up to 20 percent or more will operate more rapidly, but the process also contemplates taking advantage of the mechanical effect of air being blown through the filter as well as the chemical effect of the chelating agent and, accordingly, I have found concentration ranges from 5 to 10 percent preferable. The temperature may be as high as the boiling temperature of the solution and is generally preferably above about 100° F. (38° C.). The precise chelating agent to be used may vary depending upon the nature of the compounds causing the clogging of the filter. Generally, ethylenediaminetetraacetic acid in a range from 5 to 10 percent will be found most useful. Frequently, it is helpful to use diethanolaminocetic acid (or sometimes called diethanolglycine) in the same concentration range, or together with the ethylenediaminetetraacetic acid, replacing a portion of it.

Similarly, monoethanolethylenediaminetriacetic acid is directly useful wherever the ethylenediaminetetraacetic acid is useful and frequently is more efficient in that its effectiveness as a chelating agent will extend into more alkaline pH ranges for a larger variety of metals. Nitrilotriacetic acid is also useful alone or in admixture with any of the other chelating agents; the concentration of the combined solution is kept in the range from 5 to 10 percent by weight. It is a somewhat less effective chelating agent than ethylenediaminetetraacetic acid, but its effectiveness is sufficient to make it an efficient material for dislodging matter from obstructed filter surfaces and, because of its lesser effectiveness as a chelating agent it has the distinct advantage of being more easily recovered. That is, in the acid recovery step described the chelates of nitrilotriacetic acid are more quickly decomposed and the acid quite quickly precipitated.

However, as indicated, the fundamental operation is the manipulation of the chelating solution in the filtration cycle and utilizing its capacity to dissolve insoluble compounds or to damage their crystal structure sufficiently to dislodge them from the interstices of filter cloths.

Though the invention has been described with reference to only a single embodiment, it is to be understood that it may be practiced without departing from its spirit or scope.

What is claimed is:

1. The method of cleaning cloth filter surfaces which have become blinded in use by finely divided insoluble metal compounds in the fibers thereof, comprising providing an aqueous solution of an amino acid chelating agent of synthetic type at a strongly alkaline pH, contacting the filter surfaces with said solution, thereby to loosen and dislodge said finely divided compounds and clean the filter, recovering the chelating agent by acidifying the solution and reforming said chelating agent solution and returning it to contacting filter surfaces, the chelating agent so used being a synthetic polyamino carboxylic acid corresponding to the following formula:

wherein X is selected from the group consisting of H, —CH₂CH₂OH, —CH₂COOM, —CH₂CH₂COOM in which M is selected from the group consisting of sodium, potassium, lithium and ammonium and

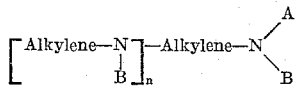

in which Alkylene is a low molecular weight group which places 2–3 carbon atoms between the nitrogens; A and B are selected from the group consisting of H, —CH₂CH₂OH, —CH₂COOM, —CH₂CH₂COOM and A and B may be the same; but not more more than one of A, B and X is hydrogen; n has an integral value in the range 0–4; and maintaining the concentration thereof in the range from about 2 percent to 20 percent by weight, and maintaining the temperature of said solution at a level in the range from about 35° C. to boiling while contacting said filter surfaces.

2. The method in accordance with claim 1 in which the polyamino polycarboxylic acid chelating agent is ethylenediaminetetraacetic acid maintained in solution at at pH of 10 to 11.

3. The method in accordance with claim 1 in which the polyamino polycarboxylic acid chelating agent is diethanol amino acetic acid maintained in solution at a pH of 10–11.

4. The method in accordance with claim 1 in which the polyamino polycarboxylic acid chelating agent is monohydroxyethylethylenediaminetriacetic acid maintained in solution at a pH of 10–11.

5. The method in accordance with claim 1 in which the polyamino polycarboxylic acid chelating agent is nitrilotriacetic acid maintained in solution at a pH of 10–11.

6. The method in accordance with claim 1 in which the polyamino polycarboxylic acid chelating agent is dihydroxyethylethylenediaminediacetic acid.

References Cited in the file of this patent

UNITED STATES PATENTS

| | | |
|---|---|---|
| 2,351,652 | Anderson | June 20, 1944 |
| 2,524,219 | Bersworth | Oct. 3, 1950 |
| 2,653,716 | Corona | Sept. 29, 1953 |
| 2,735,742 | Godehn | Feb. 21, 1956 |

OTHER REFERENCES

Versenes—Technical Bulletin No. 2, "The Versenes for Exacting Chemical Control of Cations in Solution," Fourth Edition, February 1952, Bersworth Chemical Co., Framingham, Mass., Sec. I, pages 2–23, and Sec. II, pages 57–59.

Chemistry of the Metal Chelate Compounds—Martell and Calvin, Prentice-Hall, Inc., N.Y., 1952, page 119.